(12) United States Patent
Ward et al.

(10) Patent No.: US 11,643,022 B2
(45) Date of Patent: May 9, 2023

(54) TAILGATE BICYCLE RACK

(71) Applicant: Aon Invent, LLC, Bella Vista, AR (US)

(72) Inventors: Robert Ward, Staffordsville, KY (US); Larry Robertson, Bella Vista, AR (US); Andrew Bojie, Bentonville, AR (US)

(73) Assignee: Aon Invent, LLC, Bella Vista, AR (US)

( * ) Notice: Subject to any disclaimer, the term of this patent is extended or adjusted under 35 U.S.C. 154(b) by 0 days.

(21) Appl. No.: 17/591,467

(22) Filed: Feb. 2, 2022

(65) Prior Publication Data
US 2022/0242329 A1 Aug. 4, 2022

Related U.S. Application Data

(60) Provisional application No. 63/145,905, filed on Feb. 4, 2021.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................. B60R 9/10; B60R 9/06; B60P 3/00
See application file for complete search history.

(56) References Cited

U.S. PATENT DOCUMENTS

| 4,472,639 | A | * | 9/1984 | Bianchi | B62D 33/0273 296/26.11 |
|---|---|---|---|---|---|
| 5,224,636 | A | * | 7/1993 | Bounds | B60R 9/06 224/521 |
| 5,468,038 | A | * | 11/1995 | Sauri | B62D 33/0273 296/26.11 |
| 5,700,047 | A | * | 12/1997 | Leitner | B60P 3/40 296/26.11 |
| 6,082,801 | A | * | 7/2000 | Owen | B60P 3/40 296/26.11 |
| 6,425,618 | B1 | * | 7/2002 | Garland | B60P 3/40 296/26.11 |
| 6,994,363 | B2 | * | 2/2006 | Seksaria | B60P 3/40 280/166 |
| 7,121,604 | B2 | * | 10/2006 | Reed | B60P 3/40 296/26.11 |
| 7,175,218 | B1 | * | 2/2007 | Keene | B60P 3/40 296/57.1 |

(Continued)

*Primary Examiner* — Brian D Nash
(74) *Attorney, Agent, or Firm* — Chris Tanner; FYPA PLLC

(57) ABSTRACT

A bicycle rack system for transporting bicycles within a pickup truck is disclosed. The system attaches to the inside of the pickup bed using an L-shaped base bracket which extends through the aperture between the truck bed and the tailgate. During a period when the tailgate is in the horizontal (open) position, a gap exists between the tailgate and the truck bed. Once the tailgate closed, this gap disappears. has and drapes over the pickup's existing tailgate, thereby providing support and contact surfaces for transporting one or more bicycles in an upright position. In an embodiment, the bicycle's front wheel drapes over and outside the pickup's tailgate and the rear wheel rests within the bed of the pickup truck.

16 Claims, 13 Drawing Sheets

(56) References Cited

U.S. PATENT DOCUMENTS

| | | | | |
|---|---|---|---|---|
| 7,204,537 | B1 * | 4/2007 | Oh | B60P 3/40 296/26.11 |
| 7,331,623 | B1 * | 2/2008 | Wall | B60R 9/00 296/3 |
| 7,393,035 | B2 * | 7/2008 | Leitner | B62D 33/037 296/26.11 |
| 7,533,921 | B2 * | 5/2009 | Ferrell | B60P 3/40 296/3 |
| 7,959,203 | B2 * | 6/2011 | Smith | B62D 33/027 296/26.11 |
| 8,608,219 | B1 * | 12/2013 | Platto | B62D 33/0273 296/26.05 |
| 9,487,247 | B2 * | 11/2016 | Glover | B60P 3/40 |
| 9,701,225 | B1 * | 7/2017 | Hogan | A47C 4/52 |
| 2017/0036615 | A1 * | 2/2017 | Sayegh | B60R 9/10 |
| 2022/0032854 | A1 * | 2/2022 | Burke | B60R 9/10 |
| 2022/0063508 | A1 * | 3/2022 | Shneyer | E05B 71/00 |

* cited by examiner

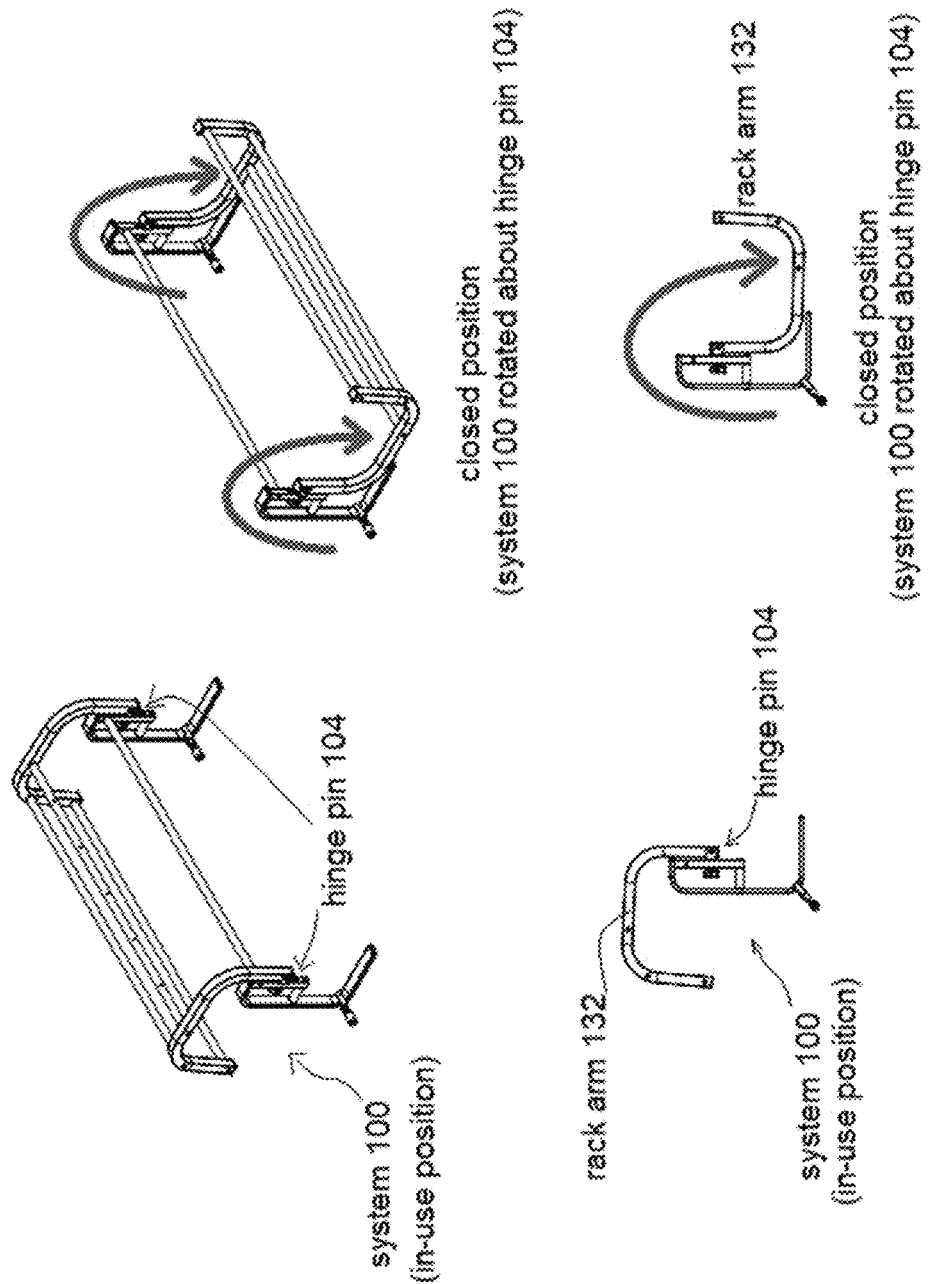

attaching the system 100 to an interior portion of a pickup bed by locating the L-shaped bases 120 at a rearward portion of the bed of the pickup truck;

connecting a squash toggle 108 to each of the L-shaped bases 120;

opening the tailgate and extending the squash toggles 108 through an aperture (gap) 804 between the truck bed and the tailgate;

positioning the tubular portions 408 of the squash toggles 108 outside the truck bed;

closing the tailgate thereby removing the aperture (gap) 804 between the tailgate and the truck;

trapping the tubular portions 408 so as to be securedly and immovably positioned outside the truck bed, yet still forcibly attached to the L-shaped base 120 by the tethers 404;

ensuring that during either active use or storage of the system 100, the tether 404 of the squash toggle 108 remaining attached to the L-shaped base 120 inside the interior of the bed of the pickup truck, but the tubular portion 408 remaining the tailgate; and thereby dissipating any forces that mighty cause the L-shape bases 120 to move out of position.

FIG. 7

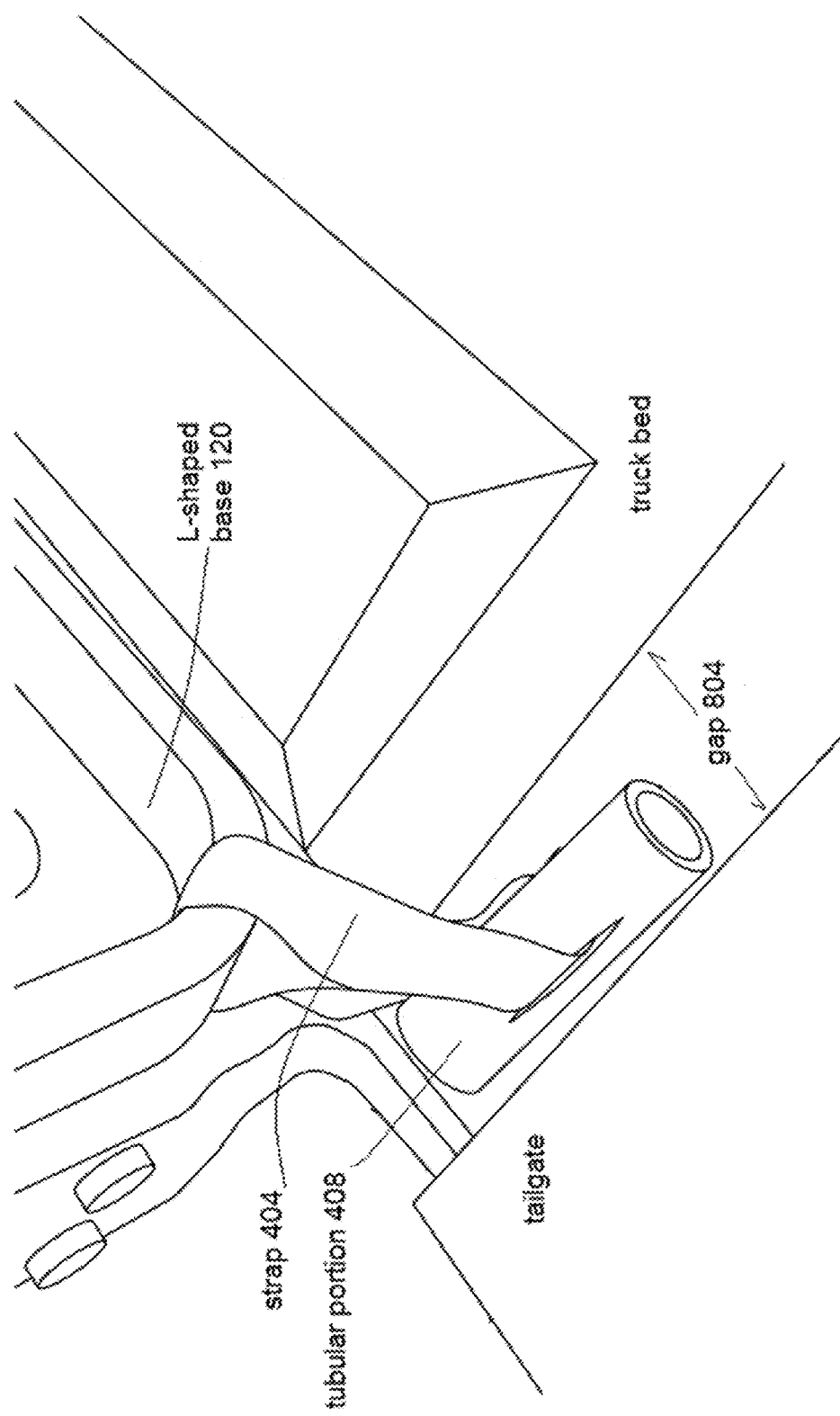

TAILGATE BICYCLE RACK

FIELD OF INVENTION

The present invention relates to vehicle mounted apparatuses utilized for transporting bicycles. More particularly, the present invention relates to apparatuses intended for transporting bicycles in the bed of pickup trucks. Further, the present invention relates to apparatuses intended for transporting bicycles on and over the tailgate of pickup trucks.

BACKGROUND

Owners of pickup trucks who wish to transport bicycles mount bicycle racks in their tailgate. Some of these bicycle racks don't work well. Carrying a bike on a moving vehicle that is subject to all kinds of forces and an expected changes in speed, momentum, can be difficult. This is made worse by crazy drivers on the road and other all kinds of problems, bumping and potholes and chuckholes in the road. Using a typical bike rack, these driving conditions cause the bikes to come to either fall off or to get out of position and potentially become a danger or a road hat road hazard either to fall off or to obscure rear view.

An option for pickup truck owners who wish to transport their bicycles is a tailgate pad. One drawback of the tailgate pad is the possibility of damage to the outside painted surface of the pickup's tailgate from debris trapped between the tailgate pad and the tailgate. Consequently, a system to overcome these and other problems is desired.

SUMMARY OF THE INVENTION

The present invention comprises of a novel bicycle rack that attaches to the inside of a pickup truck bed and rotates up and out of the pickup bed when deployed to the bicycle transport position. When the rack is not needed for transporting bicycles, it can be rotated back into the pickup bed to the stored position, or completely removed from the pickup.

The present invention consists of two transversely orientated crossmembers that provide the load bearing surface contact point for the bicycles. The two crossmembers attach to two longitudinally oriented rack arms. The rack arms provide the proper alignment and location orientation for the crossmembers. The two rack arms also provide the attachment point for two hinging elements. The two hinging elements provide a rotating/pivoting interface between the two rack arms and two mounting elements.

BRIEF DESCRIPTION OF THE DRAWINGS

FIG. 6 shows a directional diagram depicting intended/expected movement of the rotational movement of the system;

FIG. 7 is flowchart of installation of the system;

FIGS. 8B and 9 show the system partially installed when the tailgate is in its horizontal (open, non-driving) position;

DETAILED DESCRIPTION OF THE EMBODIMENTS

Figure 1:
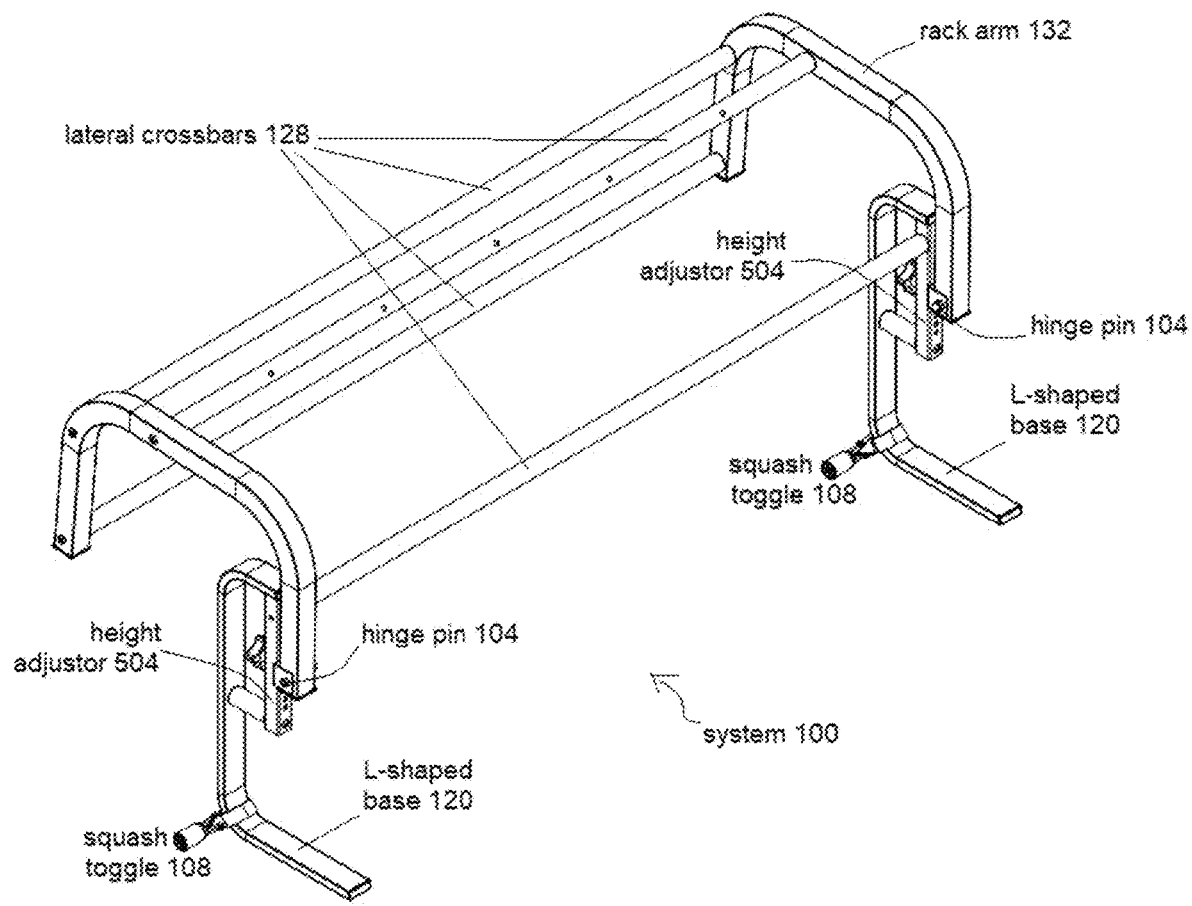
FIGS. 1, 2, and 3 show perspectives of an embodiment of a system as an assembled unit.
Figure 2:
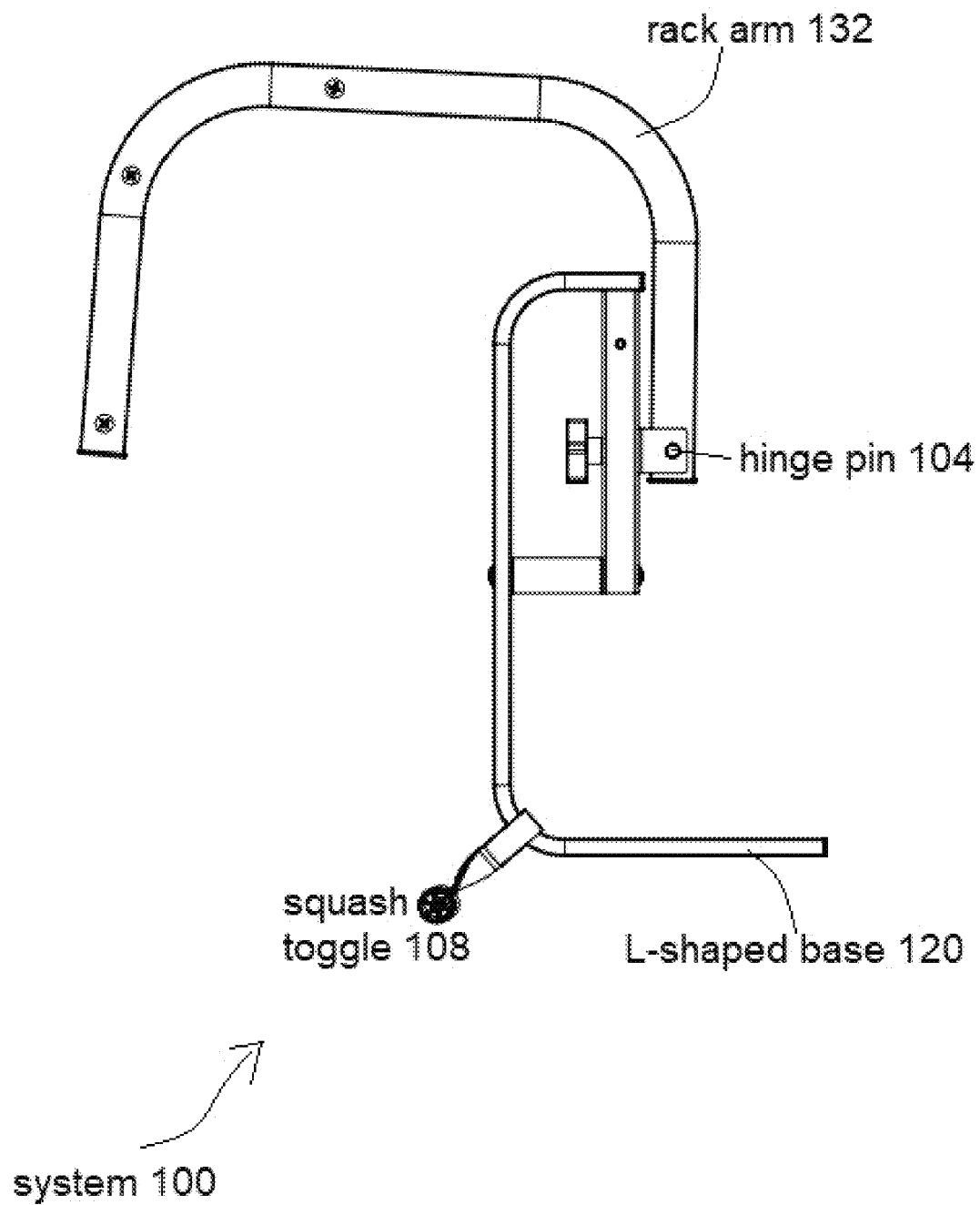
Figure 3:
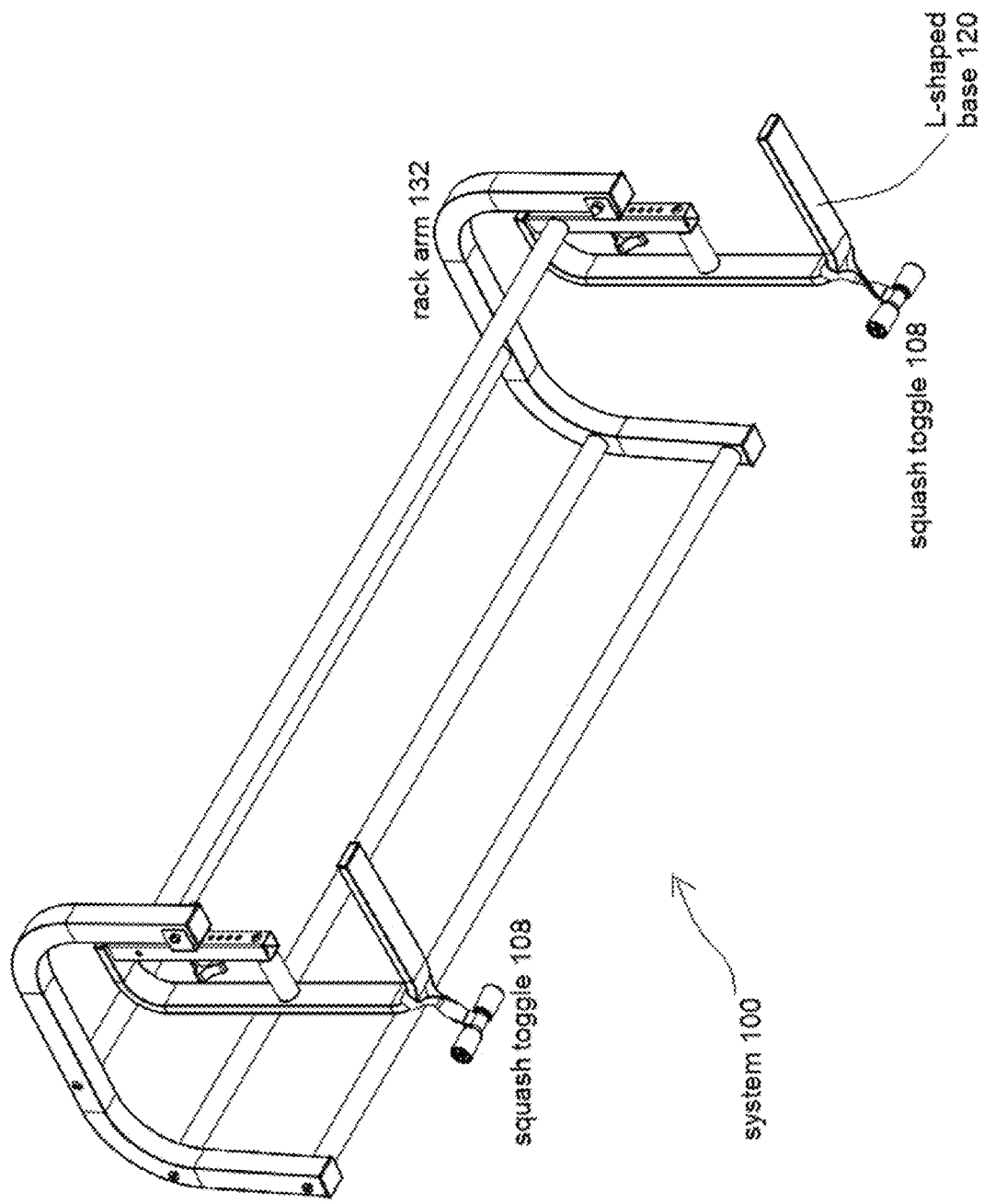

As shown in FIGS. 1-3, a system 100 comprises two L-shaped frame bases 120 and rack arms 132 connected by a series of lateral crossbars 128 that run parallel with a truck's tailgate. The system 100 makes of an existing truck tailgate in several ways, and is located both inside and outside of the truck bed and tailgate.

The system 100 facilitates rotation into a stored position, and to then change to an in-use position, by rotating about a hinge pin 104. Further, each of the L-shaped bases 120 have a squash toggle 108 attached thereto, located at the base of the L-shaped base 120. The squash toggles 108 serve to effectively secure the system 100 from coming loose during movement of the pickup truck. The squash toggles 108 conveniently fit outside of the hinges of the tailgate.

FIGS. 1-3 also show the system 100 having height adjustment mechanism 504, to adapt to a variety of sizes of tailgate.

Figure 4:
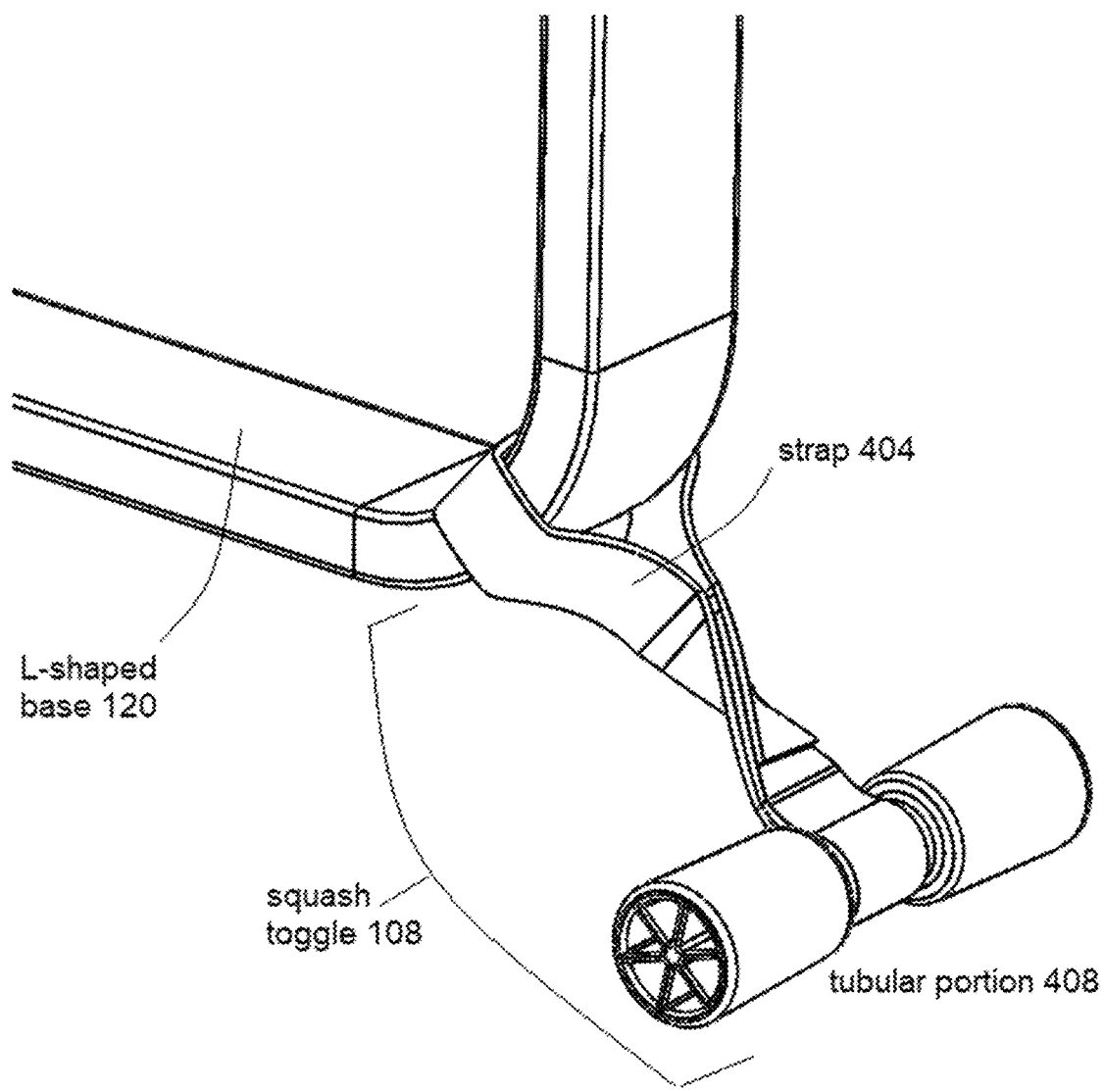
FIG. 4 shows squash toggles connected to L-shaped bases by a rubberized flexible stretchy strap.

As shown in FIG. 4, the squash toggles 108 are connected to the L-shaped bases 120 by a rubberized flexible stretchy strap 404, that connects to a tubular portion 408.

Figure 5:
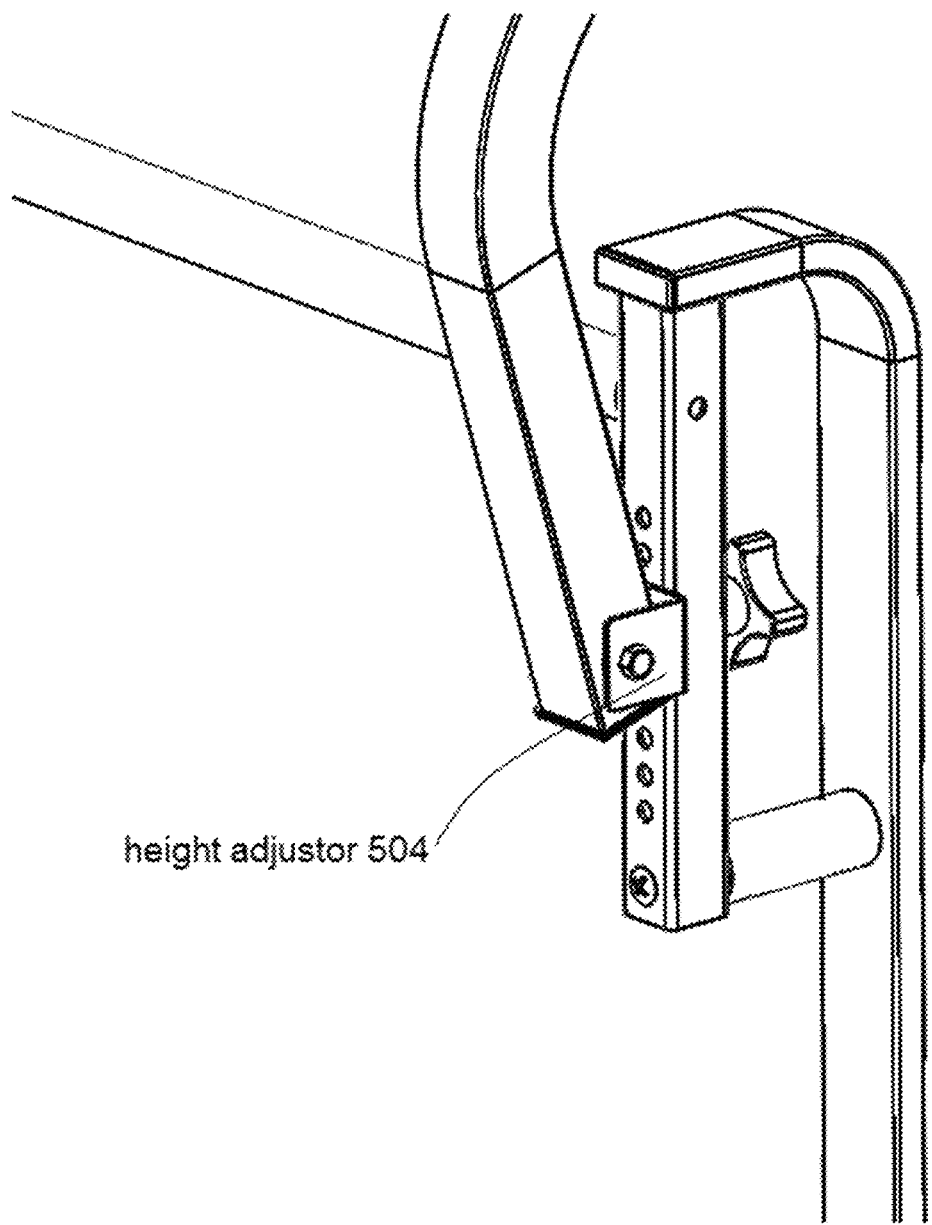
FIG. 5 shows more detail about a height adjustor within the system.

FIG. 5 shows more detail about the height adjustor 504. The system 100 is designed to fit with a variety of sizes of trucks and tailgates. To facilitate this, the height adjustor 504 helps change the vertical size of the system 100.

FIG. 6 shows a directional diagram depicting intended/expected movement of the rotational movement of the system 100, including how the rotation about the hinge pins 104 occurs.

Figure 8A:
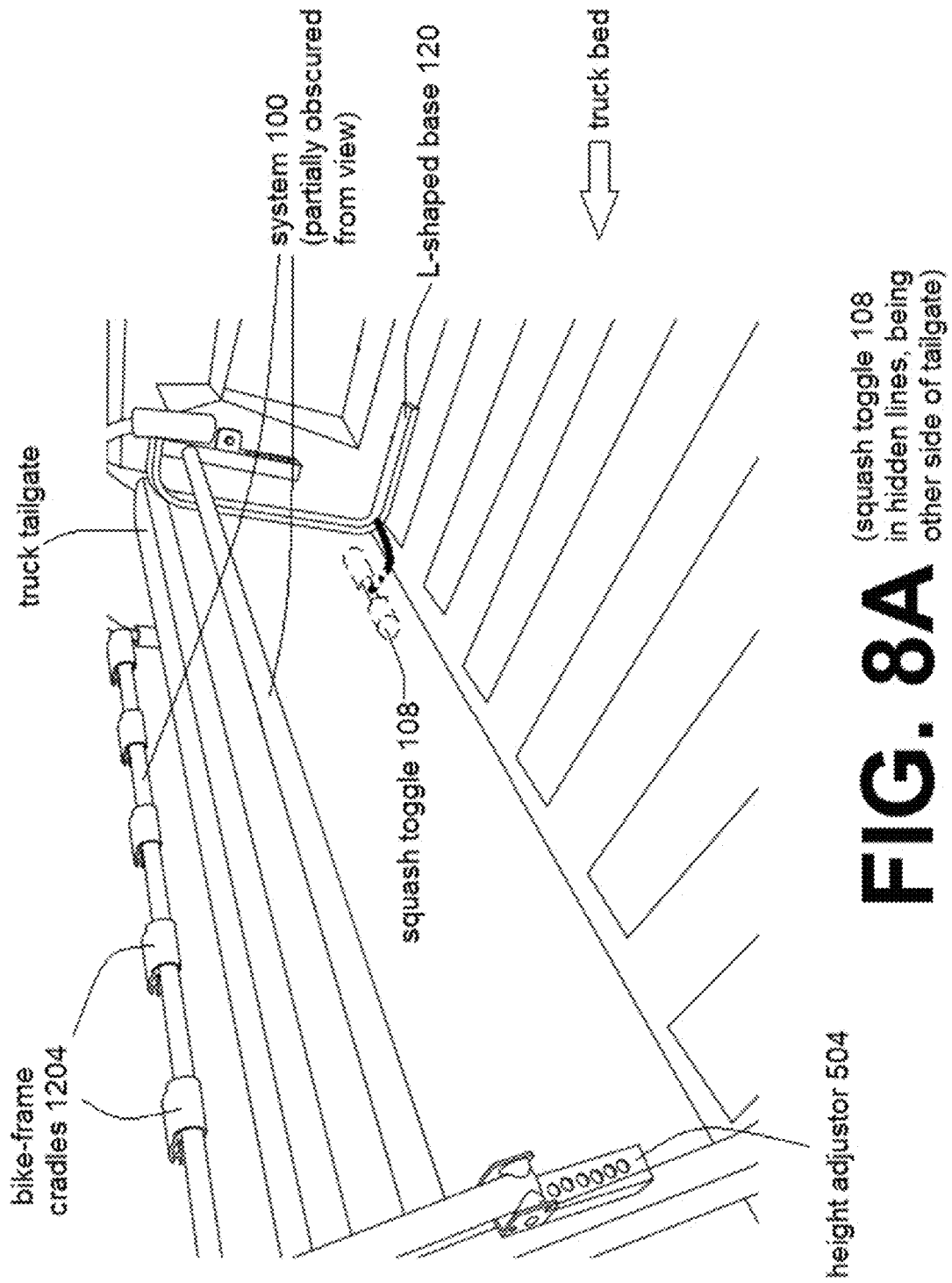
FIG. 8A shows the system attaching to the inside of the pickup bed.

Specific installation of the system 100 is shown in FIG. 7 (flowchart), and FIGS. 8A-8B. The system 100 attaches to the inside of the pickup bed by connecting the L-shaped bases 120 to the squash toggles 108 which extend through the aperture between the truck bed and the tailgate. As shown in FIG. 8B, during a period when the tailgate is in its horizontal (open, non-driving) position, a gap 804 exists between the tailgate and the truck bed. As shown in FIG. 8A, the tubular portions 408 of the squash toggles 108 are positioned outside the truck bed, and (during use) urge against an outside surface of the truck tailgate. FIG. 8A shows the squash toggle 108 in hidden line, due to it being obscured by the tailgate (in that particular view).

When the tailgate is closed, the gap 804 between the tailgate and the truck bed disappears. At such time, the tubular portions 408 are trapped to be securely and immovably positioned outside the truck bed, yet still forcibly attached to the L-shaped base 120 by the tethers 404.

Figure 9:
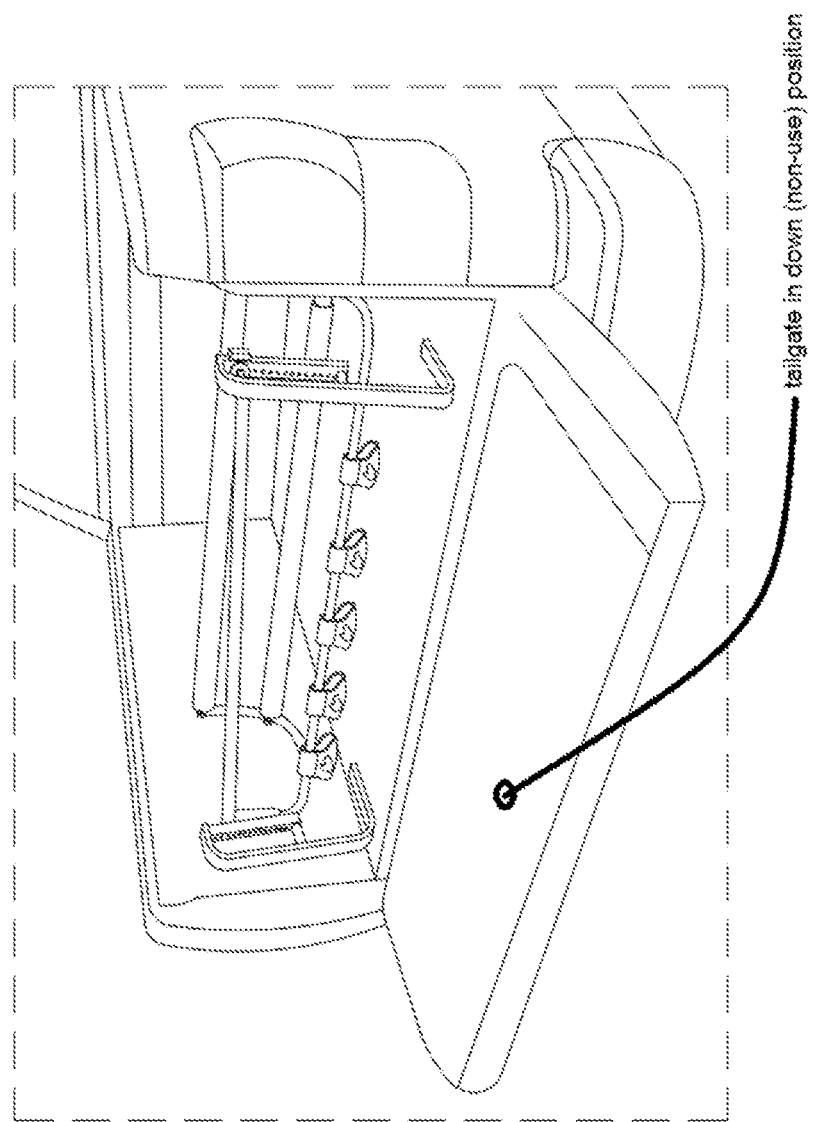
Figure 10:
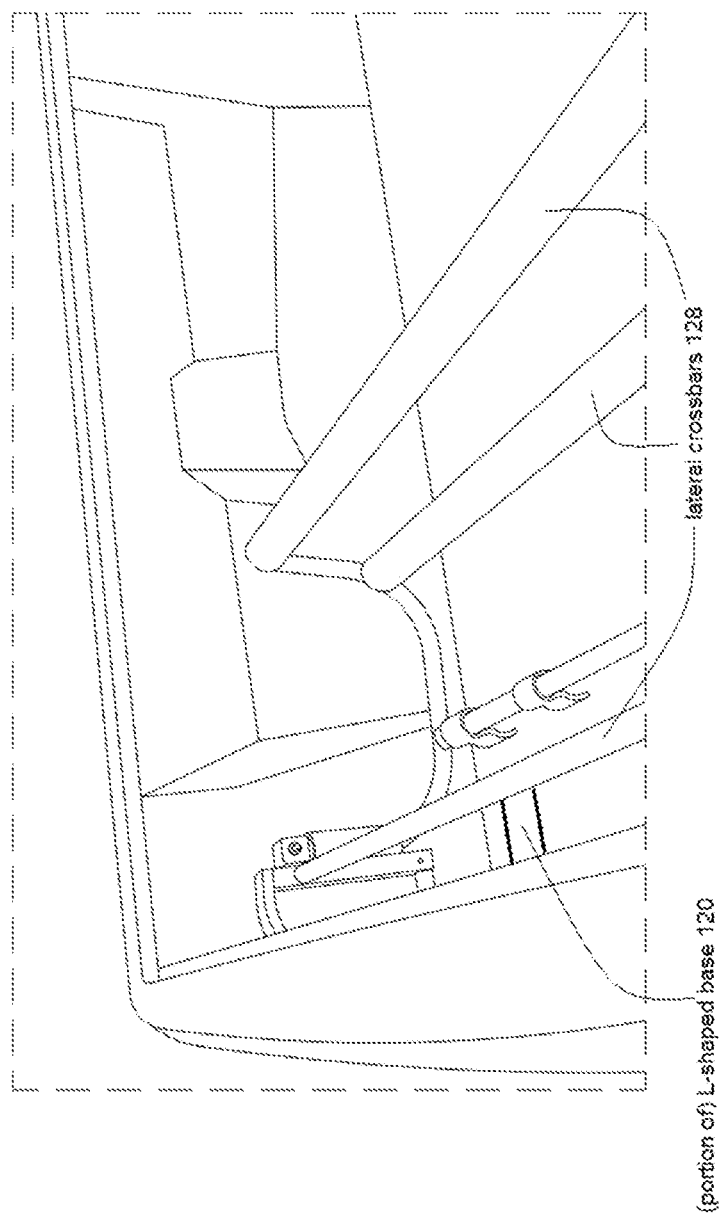
FIG. 10 shows the system in an stored (non-use) position.

FIGS. 8B and 9 show the system 100 partially installed when the tailgate is in its horizontal (open, non-driving) position, and FIG. 10 shows a partial-view of the system 100 in a stored (non-use) position.

During either active use or storage of the system 100, the tether 404 of the squash toggle 108 remains attached to the L-shaped base 120 inside the interior of the bed of the pickup truck, but the tubular portion 408 is positioned outside the tailgate of the pickup truck. The reason the tubular portion 408 remains outside the cab is that this provides a convenient securing means to make sure that the L-shaped bases 120 don't move. Any type of forces that would normally cause the L-shape bases 120 to move out of position, are effectively dissipated by positioning of the squash toggles 108.

The squash toggles 108 are trapped outside the truck bed, and trapped outside the tailgate, yet still connected to the L-shaped bases 120. Because of this, the L-shaped bases 120 remain in position and remain snug against an interior side of the tailgate.

Most movement forces applied to the system 100 are passed on through the squash toggle 108 and dissipated harmlessly against the tailgate in such a way that the system 100 remains in place, regardless of the random forces applied thereto by the truck and the road. Therefore, the bicycle attached to the system 100 remains in place securely and to the satisfaction of the driver of the truck and the users of the bicycles.

Materials and Composition

Figure 11:
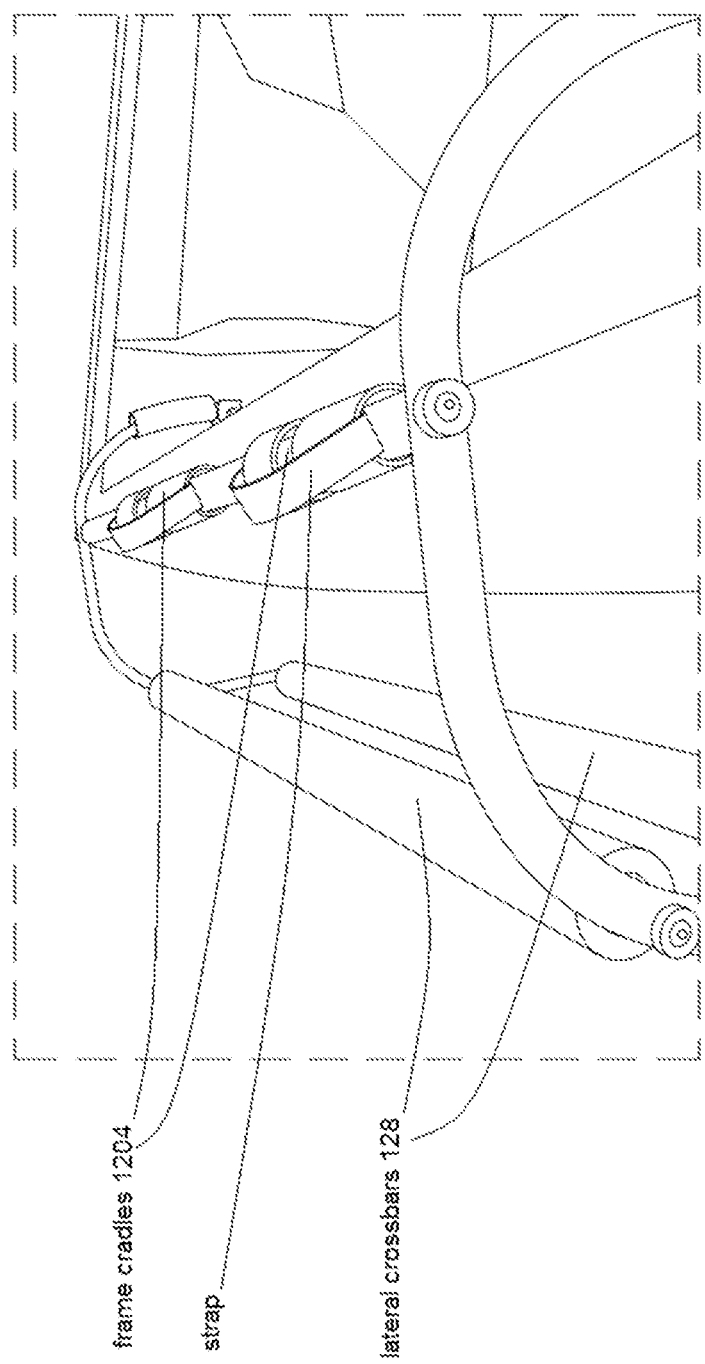
FIGS. 11 and 12 show an upper crossbar can also have bike-frame cradles.
Figure 12:
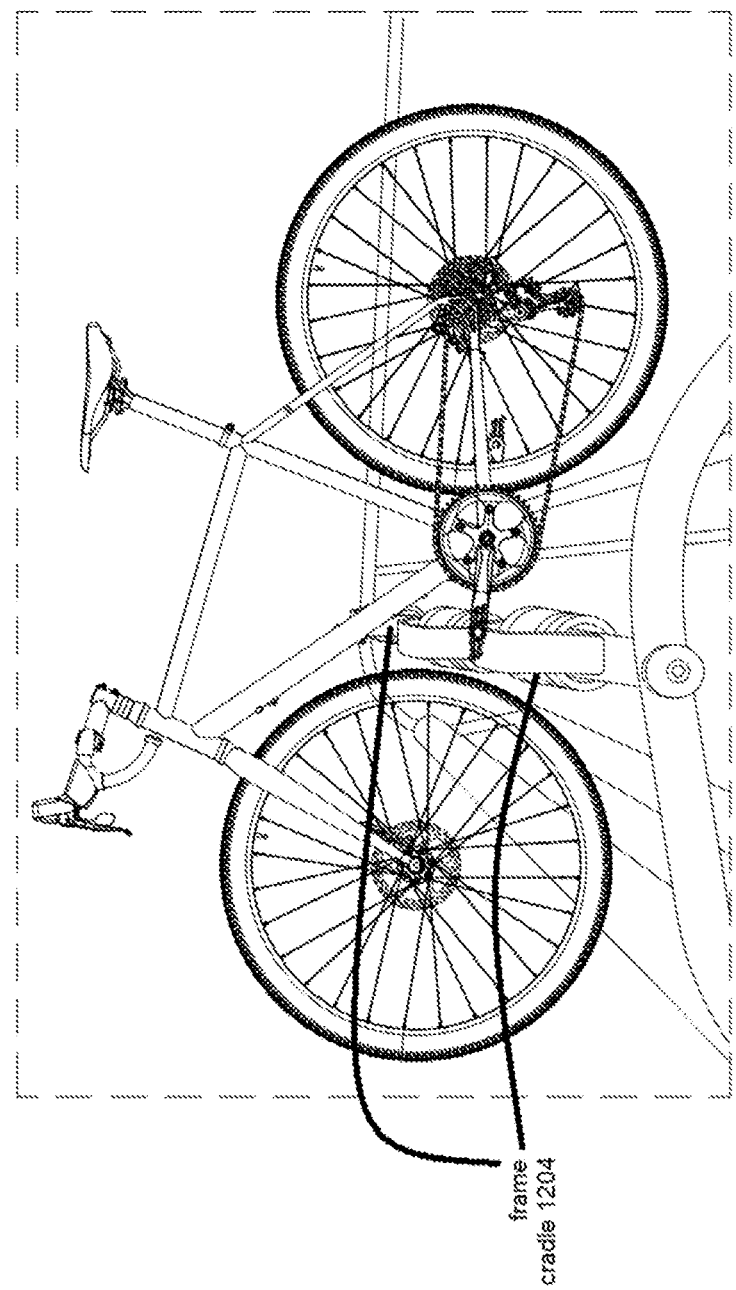

In an embodiment, the lateral crossbars 128 comprise hollow round aluminum rigid tube covered with foam padding, with an outside layer of vinyl covering. The upper crossbar 128 can be equipped with foam padding can have indents along its length, to provide a convenient visual location-spot for a bicycle's frame. Further, as shown at least within FIGS. 8A and 12, the upper crossbar can also have bike-frame cradles 1204 for settlement of a heavy frame. Further, various types of straps and organizers could also be implemented on one or more of the lateral crossbars 128. Further embodiments of the lateral crossbars 128 could be constructed from steel, carbon fiber, plastics, fiberglass, or any material with suitable properties. Alternative embodiments of the crossbars 128 comprise hollow or solid, square, rectangular, or other profile shapes. The lateral crossbars 128 can have no padding and covering, padding only, covering only, padding without indentions, and\or additional bicycle retaining elements such as, but not limited to, straps, blocks, wedges, and clamps. Example frame cradles 1204 and straps are shown in FIGS. 11 and 12.

Embodiments of the rack arms 132 comprise hollow round aluminum rigid tube so as to provide proper mounting locations and the proper alignment for the lateral crossbars 128. Embodiments of the rack arms 132 comprise steel, carbon fiber, plastics, fiberglass, or any material with suitable properties, having hollow or solid, square, rectangular, or other profile shapes.

The rack arms 132 are sized and shaped longitudinally in a manner to allow a lower lateral crossbar 128 to obtain proper clearance to the outside edge of even the widest\thickest tailgate.

Installation (Prior to Use)

The system 100 is installed by first opening the tailgate and sliding the L-shaped brackets 120 to be facing an inward surface of the tailgate. Then locating the straps 404 of the squash toggles 108 in the gap 804 between a bottom edge of the tailgate and the truck bed.

It is then possible to move the tailgate up into the upright and locked position. At that point, the system 100 will be in one of only two positions: either the open (ready to use) position, or the stored (non-use) position. There are no other positions for the system 100. Further, the system 100 only works for supporting and transporting bicycles when the tailgate is in its upright and locked position. Any other usage is not advised.

Operation (Actual Use)

As shown in FIG. 6, an actual use process comprises the system 100 in its ready to use position by rotating the rack arms 132 around the hinge pins 104 to be up and out of the truck bed, and then lowering the system 100 onto the top of the tailgate. Once the system 100 is in the ready to use position, a bicycle can be loaded onto the system 100 by lowering the bicycle onto the system 100 until the bicycle's downtube engages one of the indentions in the upper lateral crossbar 128. The bicycle's front wheel rests against a lower lateral crossbar 128, and the bicycle's rear wheel rests on the floor of the pickup bed. When the system 100 isn't being utilized to transport bicycles, it can be returned to the stored position by rotating up and back, then lowered into the pickup truck bed.

If the system 100 is in the stored (closed) position but is desired to be used, a user will do the opposite of what is shown in FIG. 6. That is, pull the center crossbar 128 to rotate about the hinge pins 104 to move the system 100 over the top of the tailgate. Afterwards, the user will locate the bike such that the back wheel is resting on the truck bed and the front wheel is protruding from the back of the truck so that the bicycle is in the opposite direction of the truck body. Typically, the front handles bars of the bicycle are turned so that the front wheel is parallel with the tailgate. However, this is not required.

If it is a desired to close the system 100 and move it back into the concealed or non-used position, a visual guide for this movement is shown in FIG. 6. Specifically, a user will cause an upper lateral crossbar 128 to rotate around the tailgate and toward the truck and lock it and secure into position.

Once installed, the system 100 provides support and contact surfaces for transporting one or more bicycles in an upright position. In an embodiment, the bicycle's front wheel protrudes outside the pickup's tailgate, either turned or straight, where the bicycle's rear wheel rests on the bed of the pickup truck.

Further Embodiments

Various security elements are also contemplated, comprising a plurality of welded rings that allow locking mechanisms to be threaded through to prevent unauthorized removal of a bike. It is also contemplated to incorporate a retractable reinforced cable that pulls out of the structure for use and then retracts back into the structure for stowage, along with a coiled cable lock which permanently attaches to one side of the frame and can be threaded through bicycle frames.

Next, the height adjustor 504 can also substitute a single long slot instead of the multiple screw holes shown in FIG. 5. Doing so would facilitate higher granularity in height-settings, plus allow changes to the height without first removing the system 100 from the L-shaped bases 120 and then reattaching in the new position. Instead, the system 100 through the height adjustor 504 could just be simply slid up or down on the base after loosening the thumb nut/screw. This would be most handy when moving an entire system 100 from one pickup to truck another, which occurs quite often once several cyclists meet at a trailhead.

Similarly, the various lateral crossbar 128 can comprise adjustable lengths. Some embodiments of the system 100 being a fixed width, for manufacturing simplicity and also for shipping containers and other merchandising issues. However, adjustable widths offer better aesthetics and allow the system 100 to be custom fitted to a specific width of an individual truck bed. There can be a lot of reasons why an owner who has customized his truck in a certain useful specific way, may want some flexibility on the lateral crossbars 128.

Another embodiment comprises attaching a padded, or unpadded, fabric covering from the top lateral crossbar 128 to the lowest lateral crossbar 128, or with additional crossbars, to form a modified traditional tailgate pad. This could also include adding a fabric panel to just the lower crossbars to form a branding and/or bicycle front wheel landing panel.

Another embodiment comprises an adjustable squash toggle 108, specifically, the stretchy strap portion 404. This would involve adding e.g. a ratcheting buckle or cam buckle for cinching the system 100 within the bed of the pickup truck.

Another mounting option that could be utilized is a fixed solid or flexible "L" or other shape bracket. The bracket would attach to the lower legs in a position that allows a portion of the bracket to be inserted in the gap between the tailgate and pick up bed, to act in the same fashion as the toggle/strap assembly. It is also possible to use a rotating bedrail attachment instead of the current design's lower "L" shaped frame bases. This would comprise attaching the two rack arms to the pickup bedrails using a clamp-on mounting bracket. This allows the same ability to rotate the rack to and from the stored and deployed positions as the current design.

Another possible design around would be to incorporate storage compartments into the rack system, in an embodiment attached to the L-shaped bases 120. A soft fabric or hard plastic storage compartment could be added to, or in place of, the lower crossbars. This would create a storage place for tools, gloves, spare parts, other. This could be implemented as a soft or hard storage case for tools. Further, a hard plastic storage compartment could be added to, or in place of, the two "L" shaped bases 120. This could create a storage compartment large enough to store shoes and possibly bike-helmets.

DISCLAIMER

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of manufacturing a bicycle rack system, comprising:
   manufacturing a pair of rack arms to have a semi-curved contour that conforms with an upper edge of a truck tailgate;
   manufacturing a plurality of lateral crossbars to have a length slightly less than a lateral length of the truck tailgate;
   connecting the pair of rack arms using the plurality of lateral crossbars thereby partially forming the bicycle rack system;
   manufacturing a pair of L-shaped bases to conform with the surface of a truck bed;
   connecting the pair of L-shaped bases to a bottom side of the bicycle rack system;
   configuring a rotational capability of the bicycle rack system to have exactly two positions of use, further comprising:
      a closed 'non-use' position that has minimal contact with the tailgate, and
      an open 'in-use' position that arches around an upper portion of the tailgate; and
   equipping each of the L-shaped bases with a separate squash toggle.

2. The method of claim 1, further comprising:
manufacturing a plurality of lateral crossbars to have an adjustable length.

3. The method of claim 1, further comprising:
configuring the bicycle rack system such that the pair of L-shaped bases remain stationary within the truck bed.

4. The method of claim 1, further comprising:
locating a hinge pin within each of the corresponding L-shaped bases.

5. The method of claim 4, further comprising:
configuring the bicycle rack system such that the pair of rack arms, connected by the plurality of lateral members, all rotate about the hinge pins.

6. The method of claim 5, further comprising:
configuring the system such that during use, the system is located both inside and outside of the truck bed and tailgate.

7. The method of claim 1, further comprising:
the squash toggles securing the system from coming loose during movement of the pickup truck by connecting to the L-shaped bases through a rubberized flexible stretchy strap.

8. The method of claim 7, further comprising:
configuring the system to have a height adjustor suitable for fitting the system with a variety of sizes of trucks and tailgates.

9. The method of claim 7, further comprising:
configuring the system such that when the tailgate is closed, the gap between the tailgate and the truck bed disappears, which in turn means trapping the tubular portions of the squash toggles to be securely and immovably positioned outside the truck bed.

10. The method of claim 9, further comprising:
configuring the system such that when the tailgate is closed, the gap between the tailgate and the truck bed disappears, which in turn means the tubular portions of the squash toggles are still forcibly attached to the L-shaped base by the tethers.

11. The method of claim 10, further comprising:
configuring the system such that during use, any type of forces that would normally cause the L-shape bases to move out of position are effectively dissipated by positioning of the squash toggles.

12. The method of claim 1, further comprising:
configuring one or more of the lateral crossbars to comprise hollow round aluminum rigid tube.

13. The method of claim 12, further comprising:
covering one or more of the lateral crossbars with an inside layer of foam padding.

14. The method of claim 13, further comprising:
configuring the foam padding with indents along its length, thereby providing a convenient visual location-spot for a bicycle's frame.

15. The method of claim 12, further comprising:
covering one or more of the lateral crossbars with an outside layer of vinyl covering.

16. The method of claim 12, further comprising:
configuring an upper crossbar with bike-frame cradles for settlement of a heavy frame.

\* \* \* \* \*